July 15, 1958  E. C. KIEKHAEFER  2,843,218
AIR CLEANER

Filed July 16, 1956  2 Sheets-Sheet 1

INVENTOR.
ELMER C. KIEKHAEFER
BY
ATTORNEY

July 15, 1958  E. C. KIEKHAEFER  2,843,218
AIR CLEANER

Filed July 16, 1956  2 Sheets-Sheet 2

INVENTOR.
ELMER C. KIEKHAEFER
BY
ATTORNEY

United States Patent Office 2,843,218
Patented July 15, 1958

2,843,218

AIR CLEANER

Elmer C. Kiekhaefer, Cedarburg, Wis.

Application July 16, 1956, Serial No. 598,186

6 Claims. (Cl. 183—71)

This invention relates generally to an air cleaner and more specifically to an improved internal combustion engine air cleaner adapted for a downdraft carburetor.

During the operation of internal combustion engines, dust particles are invariably drawn through the filter element of the air cleaner and into the carburetor. These dust particles become lodged in the gas jets of the carburetor thereby interfering with the proper operation of the engine.

It is therefore an object of the present invention to provide an improved internal combustion engine air cleaner having a more effective filter means to prevent the passage of dirt particles therethrough.

A more specific object of the invention is to provide an improved air cleaner having a vertically disposed standpipe in register with the air intake opening of the carburetor.

Another object of the invention is to provide an improved internal combustion engine air cleaner having increased self-cleaning characteristics.

A further object of the invention is the provision of an improved air cleaner having a novel flame arresting means to protect the filter element.

A still further object of the invention is to provide an air cleaner of simple design and inexpensive construction that effectively prevents the entry of dirt particles into the carburetor.

Objects and advantages other than those set forth above will be apparent from the following description when read in connection with the accompanying drawing, in which.

Figure 1:
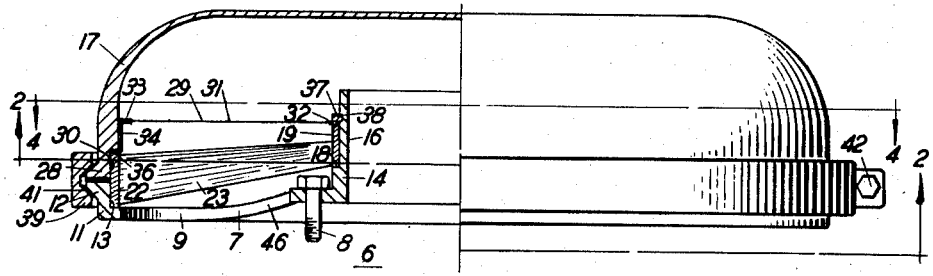
Fig. 1 is a view partly in side elevation and partly in section of a circular form of air cleaner embodying the invention.
Figure 2:
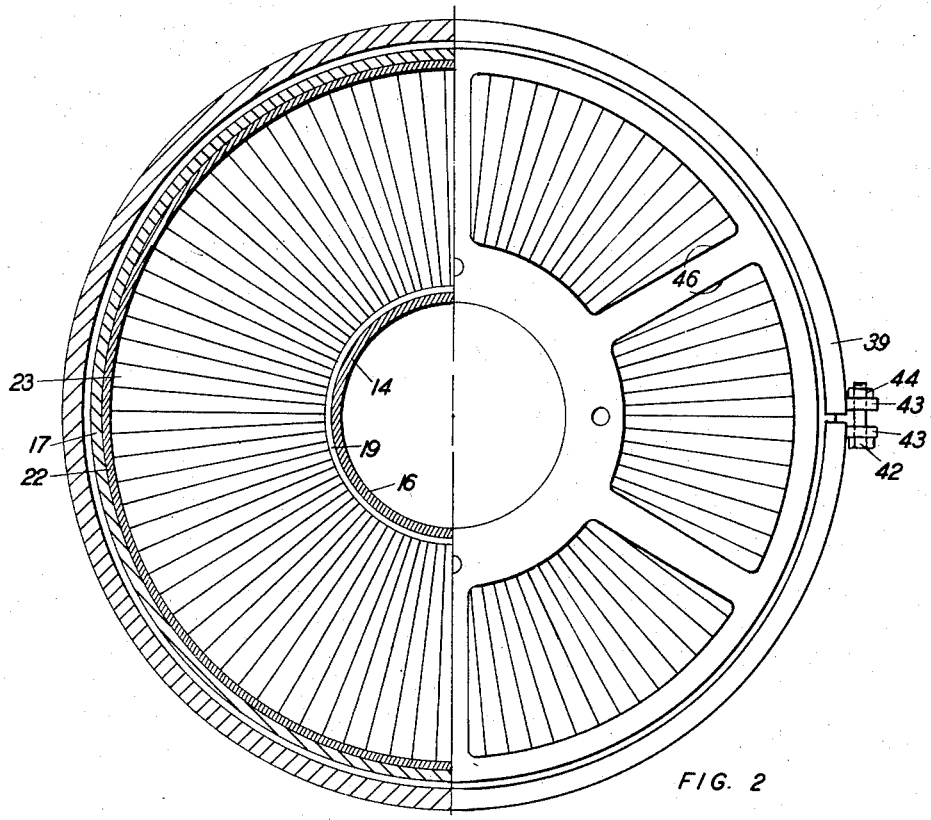
Fig. 2 is a view taken along line 2—2 of Fig. 1.
Figure 3:
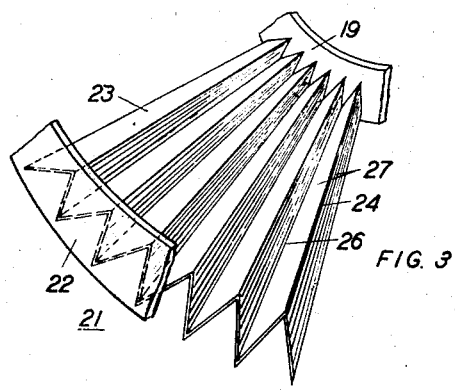
Fig. 3 is a fragmentary view in perspective of a portion of the filter element.
Figure 4:
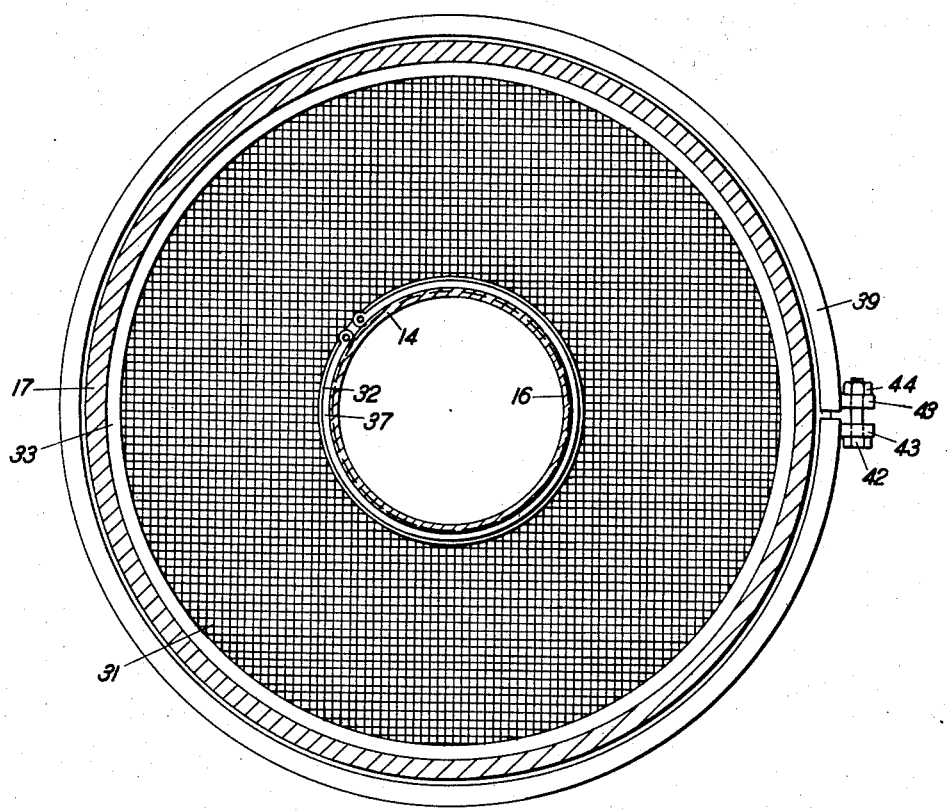
Fig. 4 is a section view taken along line 4—4 of Fig. 1.

As shown in the drawings, a preferred embodiment of this invention is illustrated as applied to an air cleaner 6. The air cleaner 6 has an annular base member 7 of substantially U-shaped cross section adapted to be secured to a downdraft carburetor, not shown, by means of screws 8, only one of which is shown, passing through a lower plate 9 of the base member 7. The plate 9 has a peripheral flange 11 transverse thereto forming a V-shaped lip 12 along the outer edge and a seat 13 along the inner edge. The plate member 9 is further provided with an axial, vertically extending cylindrical flange member 14 forming an axial air opening 16. One end of the cylindrical member 14 is integrally formed with the plate 9 while the opposite end extends above the plate and terminates a short distance from a cover 17. The outer surface of the cylindrical member 14 is stepped and forms a seat 18 for receiving an inner ring 19 of a filter 21. The filter 21 has an outer ring 22 engaging the seat 13 of the flange 11, and a corrugated paper filtering element 23 formed from a sheet of paper which is creased along lines to form alternate ridges 24 and valleys 26 connected by sloping portions 27 as shown in Fig. 3. The ends of the paper filtering element 23 are secured to the rings 19, 22 by some suitable adhesive. The filter 21 is frusto-conically shaped slanting outwardly and downwardly to provide a large filtering area and increased self cleaning characteristics.

Figure 5:
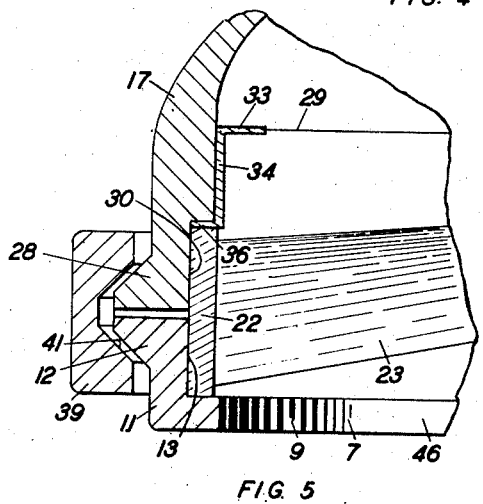
Fig. 5 is an enlarged fragmentary view of a portion of the air cleaner of Fig. 1.

The cover 17 of the air cleaner comprises a flanged cap having a peripheral lip 28 and inner seat 30 complementary to the lip 12 and seat 13 respectively as shown in Fig. 5. A flame arrestor 29 is provided to protect the paper filtering element 23 from carburetor back flash and comprises a fine meshed screen 31 secured to an inner annular washer 32 and to a radially extending flange 33 formed by one end of a collar 34. The opposite end of the collar 34 has another flange 36 oppositely disposed to the flange 32 which in the assembled position rests upon the upper end of the ring 22. The ring 19 is secured to the cylindrical member 14 by means of a retainer 37 adapted to seat in a groove 38 formed by the cylindrical member 14. The ring 22 and flange 36 are received within the seat 30 of the cover 17 which is secured to the base member 7 by means of a split annular band 39 having an inner V-shaped groove 41 for receiving the lips 12, 28 of the base member 7 and cover 17 respectively. The band 39 is tightened by means of a screw 42 passing through flanged ends 43 of the band and engaging a nut 44.

In the operation of applicant's invention, air is drawn upwardly through a plurality of openings 46 formed by the plate 9 of the base member 7, through the paper filtering element 23, the flame arrestor 29 and thence radially inwardly in a substantially horizontal path to the opening 16 formed by the cylindrical member 14 and downwardly to the carburetor. The velocity of the air once it has passed the filter 21 and flame arrestor 29 is relatively low and as the air travels at this low velocity in a substantially horizontal path to the cylindrical member 14, the dirt particles remaining in the filtered air are acted upon by gravity and drop through the flame arrestor 29 upon the filter 21. The extension of the cylindrical member 14 upwardly from the plate 9 prevents the dirt particles collecting upon the filter 21 from being drawn into the carburetor.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. In an air cleaner, the combination of: a base member forming air inlet and outlet openings; a substantially cone shaped filter having a corrugated paper filtering element secured at its edges to outer and inner annular rings carried by said base member; a flame arrestor having inner and outer edges secured to a washer and cylindrical collar respectively mounted on said outer and inner annular rings respectively; means for securing said washer and said inner ring to said base member; and means including a cover cooperating with said outer ring and said collar for securing said cover, said collar and said outer ring to said base member.

2. In an air cleaner, the combination of: an annular base member forming air inlet and outlet openings and an outer flange transverse to said plate forming a first lip along its outer edge; a substantially cone shaped filter having a corrugated paper filtering element secured at its edges to outer and inner annular rings carried by said base member; an annular meshed screen flame arrestor having inner and outer edges secured to a washer and cylindrical collar respectively mounted on said outer and inner annular rings respectively; means for securing said washer and said inner ring to said base member; a flanged cover having an outer edge forming a second lip in register with said first lip; and an annular split band having an inner substantially V-shaped groove adapted to receive said first and second lips, said band when tightened securing said cover, said collar and said outer ring to said base member.

3. In an air cleaner, the combination of: an annular base member of substantially U-shaped cross section having a plate forming an air inlet opening, an outer flange transverse to said plate forming a first seat along its inner edge, and an inner flange concentric with said outer flange and having its inner edge forming an air outlet passage and its outer edge forming a second seat; a substantially cone shaped filter having a corrugated paper filtering element secured at its edges to outer and inner annular rings disposed in said first and second seats respectively; a flame arrestor mounted on said filter; means for securing the inner edge of said flame arrester and said inner ring to said base member; a flanged cover having an outer edge forming a third seat in register with said first seat, said third seat receiving the outer edge of said flame arrestor and said outer ring; and means for securing said cover, said outer edge of said flame arrestor and said outer ring to said base member.

4. In an air cleaner, the combination of: an annular base member of substantially U-shaped cross section having a plate forming an air inlet opening, an outer flange transverse to said plate forming a first seat along its inner edge, and an inner flange concentric with said outer flange and having its inner edge forming an air outlet passage and its outer edge forming a second seat; a substantially cone shaped filter having a corrugated paper filtering element secured at its edges to outer and inner annular rings disposed in said first and second seats respectively; a flame arrestor mounted on said filter; a groove formed by said inner flange; a retainer received by said groove to secure the inner edge of the flame arrestor and said inner ring to said base member; a flanged cover having an outer edge forming a third seat in register with said first seat, said third seat receiving the outer edge of said flame arrestor and said outer ring; and means for securing said cover, said outer edge of said flame arrestor and said outer ring to said base member.

5. In an air cleaner, the combination of: an annular base member of substantially U-shaped cross section having a horizontally disposed plate forming an air inlet opening, an outer flange transverse to and integral with said plate forming a first lip along its outer edge and a first seat along its inner edge, and a vertically extending inner flange integral with said plate and concentric with said outer flange having its inner edge forming an axial air outlet passage and its outer edge forming a second seat; a substantially cone shaped filter having a corrugated paper filtering element secured at its edges to outer and inner annular rings disposed in said first and second seats respectively; an annular meshed screen flame arrestor having inner and outer edges secured to a washer and cylindrical collar respectively disposed on said outer and inner annular rings respectively; a groove formed by said inner flange; a retainer received by said groove to secure said washer and said inner ring to said base member; a flanged cover having an outer edge forming a second lip and a third seat in register with said first lip and first seat respectively, said third seat receiving said outer ring and said collar; and an annular split band having an inner substantially V-shaped groove adapted to receive said first and second lips, said band when tightened securing said cover, said collar and said outer ring to said base member.

6. An air cleaner for engine carburetors and the like, comprising a circular base having an upstanding inner cylindrical flange defining an air outlet and adapted to be supported upon a carburetor inlet structure to supply air to the carburetor, said base having an outer circumferential upstanding flange joined to said inner flange by a series of circumferentially spaced spoke-like members to provide intermediate inlet openings for air to said cleaner, an air filter extending continuously over said inlet openings and seated against said inner and outer flanges to filter air passing upwardly therethrough, a flame arrestor carried by said filter and spaced above the same to protect the same from flame flashes, means carried by said inner flange and securing said flame arrestor and filter in place relative thereto, and a cover for said air cleaner removably carried by said outer flange and securing said flame arrestor and filter in place relative to said outer flange.

References Cited in the file of this patent

UNITED STATES PATENTS

| | | |
|---|---|---|
| 1,946,015 | Carnahan | Feb. 6, 1934 |
| 2,269,664 | Hallerberg | Jan. 13, 1942 |
| 2,274,594 | Donington et al. | Feb. 24, 1942 |
| 2,527,004 | Fett | Oct. 24, 1950 |
| 2,720,279 | James | Oct. 11, 1955 |

FOREIGN PATENTS

| | | |
|---|---|---|
| 697,242 | France | Oct. 27, 1930 |
| 1,119,440 | France | Apr. 3, 1956 |